(No Model.)
F. AMES.
PLAYING CARD.
No. 491,302.                  Patented Feb. 7, 1893.
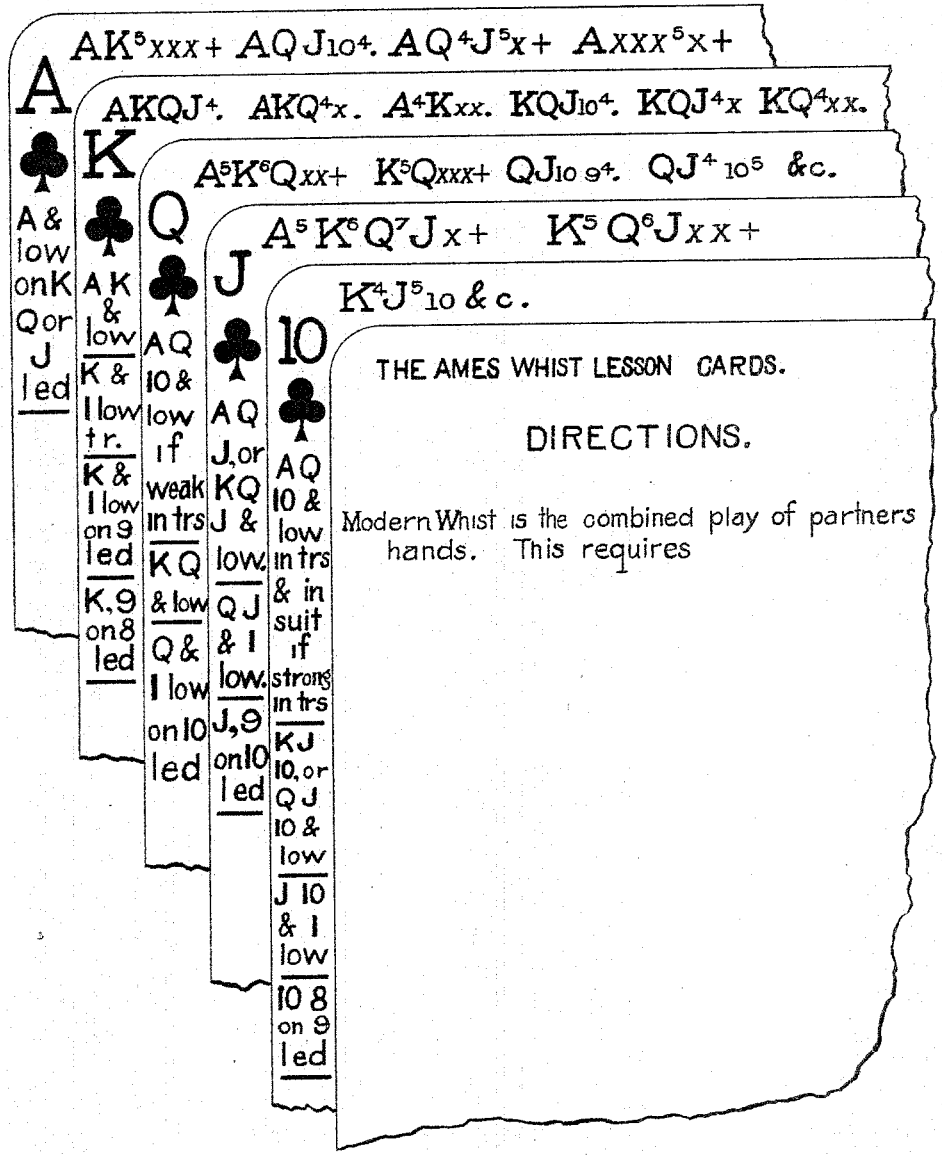
Witnesses.                                Inventor.

UNITED STATES PATENT OFFICE.

FISHER AMES, OF NEWTON, MASSACHUSETTS.

PLAYING-CARD.

SPECIFICATION forming part of Letters Patent No. 491,302, dated February 7, 1893.

Application filed January 22, 1892. Serial No. 418,905. (No specimens.)

*To all whom it may concern:*

Be it known that I, FISHER AMES, of Newton, in the Commonwealth of Massachusetts, have invented a new and useful Improvement in Playing-Cards, which improvement is fully set forth in the following specification.

The object of my invention is to furnish a method of guidance to and instruction in the rules for the correct play of the cards in a "hand" in a game at whist, which shall be available when most wanted, to wit, when the cards are in the player's hand and in the course and progress of the game. Whist is a game of science, requiring much study and effort to learn and remember the rules for play; and a device which shall reduce the labor to the minimum, and furnish accurate guidance to play at the moment when it is needed, must be of service and value. My invention furnishes this guidance and instruction, at the moment of play, for the correct play, according to the latest most scientific methods, of each card in every possible combination of cards in the "hand" of a player at the game of whist. My knowledge of these rules is obtained from a long and careful study of the science, with frequent practice, and is evidenced by my books upon the subject;—but, if by any accident any error should be made in the enunciation of the rules, this would not impair the merits of my invention, for under it the correct rules can be set before the player, whether I may have succeeded in so doing or not. The means by which this object is accomplished is a system of letters, figures and signs, representing different cards and combinations of cards, so contrived and arranged upon the face margins of the high cards, (in opposed and duplicate positions,) and so varying according to the rank or value of the cards, and their relations to each other, and also according to whether the play be at first or second hand, that a player has or may have before him a full complete guide to the rules for the proper play of his cards, in a game of whist, whatever they may be, according to the latest and best scientific methods, both for first and second leads, and for play at second hand; and also an accompanying card of explanations and directions, to accompany each pack, explaining the meanings and use of the letters, figures and signs, on the card margins; and also containing general rules and instructions; so that the whole pack, with its accompanying card of directions, constitutes a complete and accurate text book, or course of instruction in the rules of the game, and the player has in his hand a ready reference, or guide to the correct rules for its play, at the time when a question may arise in his mind as to what the proper rule is. After having assorted his hand, a player, from a simple inspection of his cards, has before him the correct rule for his play, whether at first or second lead, or at second hand from the particular combination of cards that he holds, whatever it may be. If he is ignorant, or forgetful, of the proper rule, he is at once informed or reminded of it, and thus, by frequent practice with these cards, he can with little or no effort acquire insensibly and easily a thorough knowledge of the proper rules.

I am aware that printed matter, such as advertisements, and even a general rule for a card game, have been placed upon the face of a playing card. But my invention goes far beyond that; in fact it is not printing a rule or rules on the face of the card, but a contrivance and device of a peculiar set and system of letters, figures and signs, arranged in a peculiar manner, varying according to the rank and value of each card, and each appropriate to the card upon which it is, so that the whole when taken together, as explained by the card of directions which accompanies each pack, constitutes a course of instruction in, and key or guide to, the proper rules for play in all possible combinations of cards to be found in a "hand" at whist.

The whole pack together is a complete thing, and taken together with its accompanying direction card, constitutes what I term and claim to be "whist lesson cards," by means of which, with very slight expenditure of time and labor, and at the time when most convenient and instructive, to wit, while actually engaged in the game, the beginner can learn and master, and the more advanced player can be reminded of the correct rules for play. Thus, to specify more particularly;—I have placed on the top margins of all the high cards, that is all cards regarding the proper order of leads of which there can be any question, or doubt in the mind of the player, a set of letters, figures and signs, representing all possible combinations of cards from which each of them is led on an original lead from a strong suit, varying according to the rank or value of each card. The accompanying card of directions explains the meanings and uses of this set or system, of letters, figures and signs; so that by an inspection of the top margins of his long, (or strong,) suit, the player can know which of the cards of it, if the combination he holds is shown there, should be led first and second. The marginal matter on top of the cards is as follows;—

On the ace;—A $K^5$ $x$ $x$ $x^+$ A Q J $10^4$. A $Q^4$ $J^5$ $x^+$ A $x$ $x$ $x^5$ $x^+$ $x$ stands for a low card, (lower but not in sequence with last named card;) and the sign $+$ for, "or more.;"—and, as stated in the direction card, on top of each of the high cards is shown every combination from which it is led on an original lead from strength. Thus, interpreting these signs, &c. above given on the ace;—the player, if he holds any one of these combinations there represented, to wit, ace, king and 3 or more low cards; A, Q, J and 10, (without others;) A Q J and 1 or more low cards;—or A and 4 or more low cards;—is instructed that he should lead the ace. The correct second leads are indicated, according to number of cards in the suit, by the exponent figures 4, 5, &c. Thus, after leading A from A, K and 4 or more low, the correct second lead is the K;—after A from A, Q, J, 10. the correct second lead is the 10. After A from A, Q, J, and 1 or more low, the correct lead is Q from 4, J from 5 or more, originally in the suit. After A from A and 4 or more low cards, the correct second lead is of the original fourth best card. Thus, by the above set of letters figures and signs, there is represented on the top margin of the ace, every combination from which it should be originally lead, and the proper lead to follow in each case.

On the King;—A, K, Q, $J^4$. A, K, $Q^4$, $x$. A, $K^4$, $xx$. K, Q, J, $10^4$. K, Q, $J^4$, $x$. K, $Q^4$, $xx$. showing that from each of the combinations represented, and only from those, the K is originally led, and that the proper second lead is shown by the card sign or letter, which is marked with the exponent figure $^4$.

On the Queen;—$A^5$ $K^6$ Q $xx^+$ $K^5$ Q $xxx^×$ Q J 10 $9^4$. Q $J^4$ $10^5$ &c. showing the only combinations from which the queen is originally led, and the proper second leads to follow her, according to the number of the suit originally held.

On the Jack;—$A^5$ $K^6$ $Q^7$ J $x^+$ $K^5$ $Q^6$ J $xx^+$ showing that jack (knave) is led only from A, K, Q, J and 1 or more low; or K, Q, J and 2 or more low, and that the proper card to follow with depends upon the number of cards originally in the suit, e. g. with A K Q the A from 5; K from 6; Q from 7 or more in suit.

On the ten;—$K^4$ $J^5$ 10 &c. That is, showing that 10 is led only from K, J, 10 and lower; and what is the proper card to follow with, as qualified and explained by the direction card.

On the side of each of the high cards, I have placed another set of letters, figures and signs, varying according to the rank or value of the card, to show what is the proper play of each from any possible combination, at second hand, or second to play. Thus, on the ace the side margin contains the following;—A and low, on K, Q, or J led;—meaning, and clearly pointing out that from A and low, the A is played at second hand on the king, queen, or jack, led by right hand adversary; and only played then.

On the King;—A, K and low. K and 1 low tr. K and 1 low on 9 led. K, 9, on 8 led. those being the combinations, and the only combinations from which the king is correctly played at second hand.

On the Queen;—A Q 10, and low, if weak in trs. K Q and low. Q, 10 on J led. Q and 1 low, on 10 led.

On the Jack;—A Q J, or K Q J and low. Q J and 1 low J, 9, on 10 led.

On the ten;—A Q 10, and low, in trs., and in suit if strong in trs. K J 10 or Q J 10 and low. J 10 and 1 low. 10, 8, on 9 led.

The direction card, or card of explanations, is as follows;—

THE AMES WHIST LESSON CARDS.

Copyright by F. Ames, 1891.

*Directions.*—Modern whist is the combined play of partners' hands. This requires a close observance of rules which are hard to learn and remember. These cards teach the rules while playing the game. Having learned the meanings of the signs &c. the player has a full guide to correct play.

Sort your hand carefully. Lead, first, from longest, or best long, suit, (trumps, if 6, or 5 with good suit,) and the fourth best card held of it, unless a high card is directed. On top of each high card is shown every combination from which it is led originally from strength. If the combination you hold is shown on top of any card of the suit, lead that card.

$x$ means a low card; $xx$ two low cards, and so on;—(that is lower, but not in sequence with last named card.) $+$ = or more. &c= and one or more lower. The number held of the suit must correspond with that shown on the card, as the leads vary accordingly.

The correct second leads are shown by the exponent figures $^4$, $^5$, &c, according to the number of the suit led from. $A^4$, shows card to be led second from 4; a $^5$, from 5; a $^6$ from 6; and so on.

The combinations shown on the cards, and the correct leads are as follows;—On A;— A K$^5$ x x x$^+$ (that is, from A K and 3 or more low, lower than Q), lead A, then K. A, Q, J, 10$^4$. (from A, Q, J, 10, without others,) lead A, then 10. A, Q$^4$, J$^5$, x$^+$ (from A Q J and 1 or more low, lower than 10), lead A, then Q from 4, J from 5 or more originally in suit. A x x x$^5$ x$^+$ (from A and 4 or more low), lead A, then original fourth best.

On K;—A K Q J$^4$. (from A K Q J, without others), lead K then J. A K Q$^4$ x. (from A K Q and 1 low, lead king, then Q). A$^4$ K x x. (from A K and 2 low,) lead K, then A. K Q J 10$^4$. (from K Q J 10,) lead K, then 10. K Q J$^4$ x. (K Q J and 1 low,) lead K, then J. K Q$^4$ x x. (2 lower than J), lead K, then if K draws A, Q; if K wins, then fourth best.

On Q;—A$^5$ K$^6$ Q x x$^+$ (from A K Q and two or more lower than J), lead Q, then A from 5, K from 6 or more in suit. K$^5$ Q x x x$^+$ (from K Q and 3$^+$ low), lead Q, then K if Q draws A; if Q wins, then fourth best. Q J 10, 9$^4$. (without others,) lead Q, then 9. Q J$^4$ 10$^5$ x$^+$ (Q J 10 and 1$^+$ low), lead Q, then J from 4, 10 from 5$^+$ in suit.

On J;—A$^5$ K$^6$ Q$^7$ J x$^+$ (A K Q J and one or more low), lead J, then A from 5, K from 6, Q from 7$^+$ originally in suit. K$^5$ Q$^6$ J x x$^+$ (K Q J and 1$^+$ low,) lead J, then K from 5, Q from 6$^+$ in suit. (Note.—J is led in these cases even though holding 10 also.)

On 10;—K$^4$ J$^5$ 10 &c. (K J 10 and 1$^+$ lower), lead 10, then, if 10 draws Q, or A and Q, K from 4, J from 5$^+$ in suit;—if 10 wins, lead fourth best;—if 10 draws A and not Q, lead K.

All other cards are led only as fourth best; and from all combinations other than those above given, lead, first, the fourth best. The 9 is led only as fourth best, and from the following combinations;—A Q 10 9. A J 10, 9.

Second hand low, except as directed on high cards. On side of each high card is shown every combination from which it is played at second hand. If being second to play, you hold any combination shown on a card of the suit led, play that card.

Third hand high, (or lowest of a head sequence). But from A Q J with or without low, play J. From A Q with or without low, play Q.

Return partner's trump lead, or lead to his call, at once, with A if you have it. Return his lead with higher of 2, lowest of 3 or more, left of it. Lead to his tr call, A, or highest of 3, lowest of 4 or more trs. Do not force him if you are weak, do if strong in trs. Do not tr a doubtful trick, if strong; do if weak, in trs.

Discard, first from weakest suit; afterward according to hand, to protect high cards;— but if opponents lead or call for trumps discard, first, from best protected suit.

Watch the table and note the cards played, and by whom.

(The above form may be slightly varied.)

The drawing shows the top and side margin of all the cards upon which the printed matter is placed, as now arranged by me; the opposite and reverse margins, containing the same matter, and the faces of the cards, being concealed by the arrangement of the cards, as represented. It will appear from the drawing that all possible combinations are represented from which any of the cards shown, (that is a high card,) is played at first or second lead, or at second hand, in the course of the play of a hand at whist., according to the latest and most scientific methods.

Matters requiring the exercise of skill, and judgment based upon the observation of the indications of the positions of cards not played, depend upon long practice under, and with a thorough knowledge of, the rules, as here given.

I claim that my invention furnishes a method of instruction and a key or guide to the rules, in a novel, original and ingenious manner;—and is useful and valuable.

I claim, as my invention,

1. The herein described playing cards, provided on their faces with letters, figures or marks, as set forth, the marks on each card indicating the combinations of cards including the one so marked from which combinations the card so marked is the proper lead.

2. The herein described playing cards provided on their faces with letters, figures or marks, as set forth, said marks indicating the combinations of cards including the one so marked from which combinations the card so marked is the proper lead, and having additional marks indicating the correct second lead according to the number of cards in the suit.

3. The herein described playing cards having on their faces marks indicating the various combinations of cards including the one so marked from which combinations the card so marked is the proper second hand play, substantially as set forth.

4. The herein described playing cards, provided on their faces with letters, figures or marks, as set forth, the marks on each card indicating the combinations of cards including the one so marked from which combinations the card so marked is the proper play.

FISHER AMES.

Witnesses:
F. F. RAYMOND, 2d,
J. M. DOLAN.